July 28, 1936.  K. SYDNES  2,049,232

DEVICE FOR INDICATING MAGNETIC DIRECTIONS

Filed Oct. 25, 1933   4 Sheets-Sheet 1

Inventor:
Kolbein Sydnes
by Fetherstonhaugh & Co.
attys

July 28, 1936.  K. SYDNES  2,049,232
DEVICE FOR INDICATING MAGNETIC DIRECTIONS
Filed Oct. 25, 1933  4 Sheets-Sheet 2
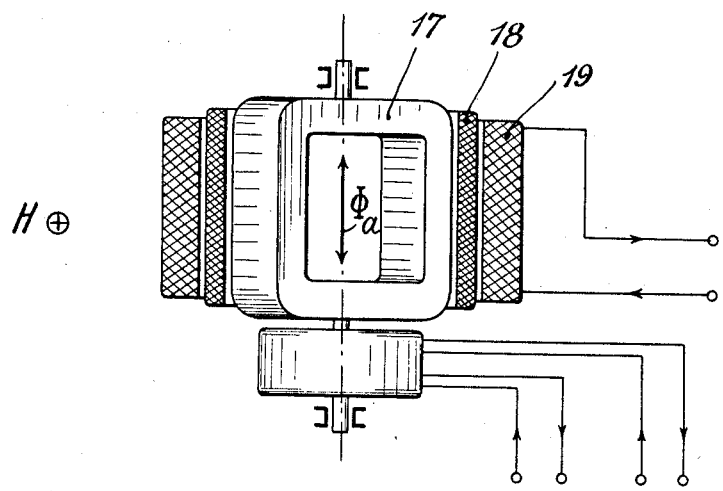
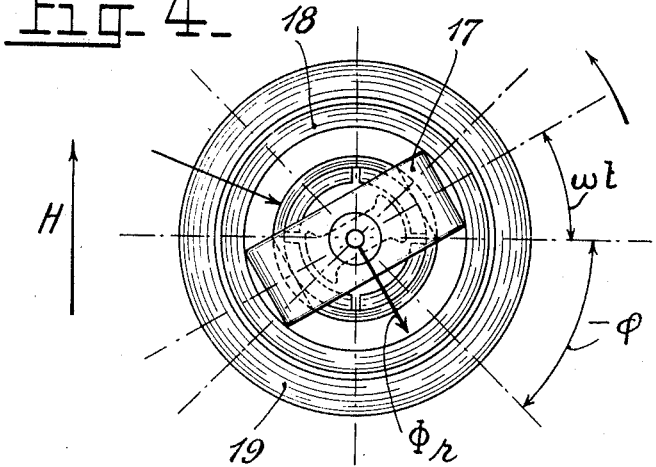
Inventor:
Kolbein Sydnes
by Fetherstonhaugh & Co.
attys.

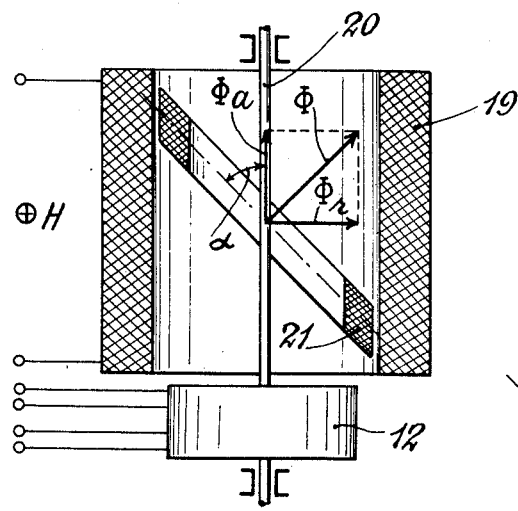
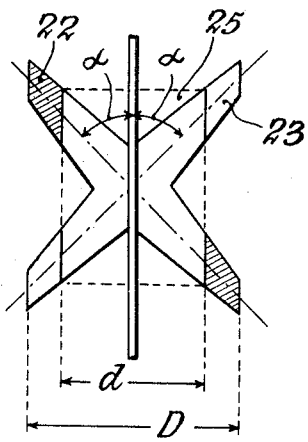
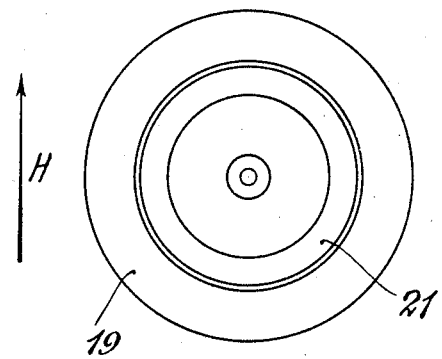
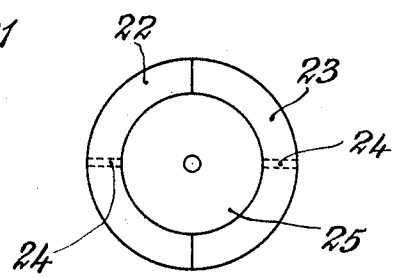

July 28, 1936.  K. SYDNES  2,049,232
DEVICE FOR INDICATING MAGNETIC DIRECTIONS
Filed Oct. 25, 1933  4 Sheets-Sheet 4
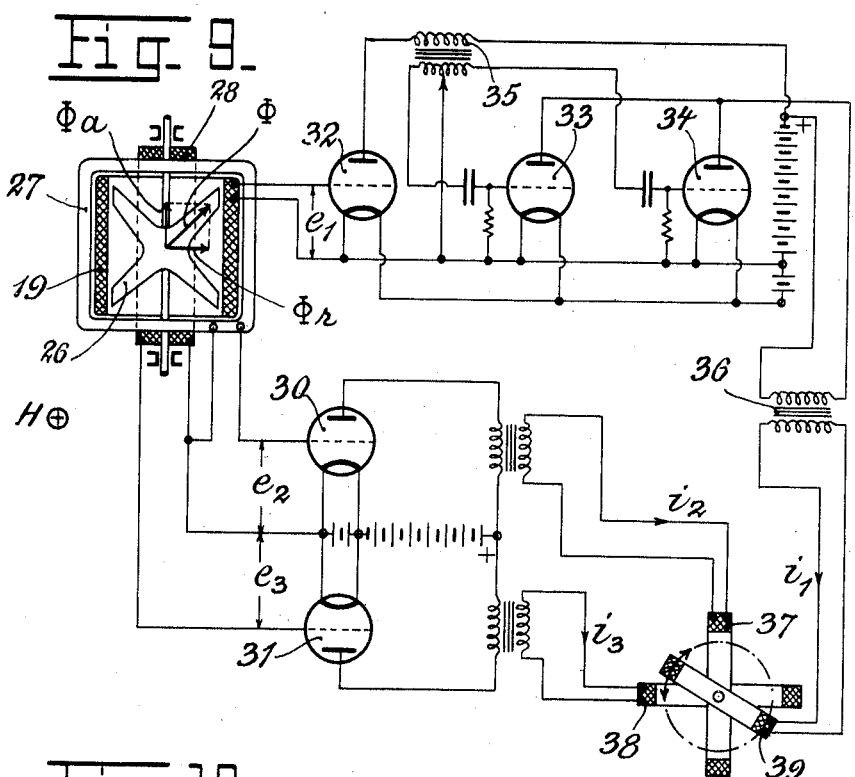
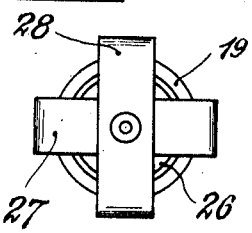
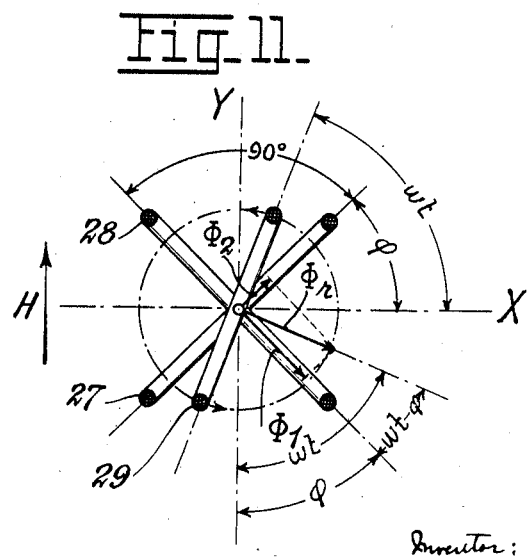
Inventor:
Kolbein Sydnes Patented July 28, 1936

2,049,232

UNITED STATES PATENT OFFICE 2,049,232

DEVICE FOR INDICATING MAGNETIC DIRECTIONS

Kolbein Sydnes, Stabekk, near Oslo, Norway

Application October 25, 1933, Serial No. 695,205
In Norway October 25, 1932

15 Claims. (Cl. 33—204)

This invention relates to devices for indicating the direction of a magnetic field. The present device has for its main object to determine the direction of the horizontal component of the earth magnetic field, and is intended to be used as a compass.

The device is of that kind, by which the current or currents, induced by the rotation of an inductor coil in the earth magnetic field, is caused to indicate the direction of said field, being the current dependent on the angular position of the inductor, in relation to the field.

In the devices hitherto known the rotor of the earth inductor is provided with commutators or slip rings and brushes. Thereby many and great difficulties are caused, for instance friction, vibration of the brushes causing bad contact, wear etc., Especially in the present case it is of importance, that the current induced in the rotor winding does not vary owing to faulty operation of the brushes. In the following a device is described, according to which the indication is effected by measure of the phase differences between the alternating currents induced. By means of the principle of this device it also is possible to construct an earth inductor without brushes or other sliding contacts, the rotor and stator of the inductor being electromagnetically coupled together instead. This, of course, is of great advantage. It also is very advantageous that only alternating currents are used, thus eliminating the drawbacks of mechanical commutation and of direct magnetic fields.

The main feature of the invention is, that the winding of the inductor rotor is a short-circuited winding, a part of which has such an axial projection, that an axial rotor flux is produced, this flux inducing in a fixed coil an alternating current (and an electromotive force respectively), the phase of which is independent on the angular position of the inductor in relation to the magnetic field, which alternating current by co-operation in a suitable indicating instrument with alternating currents produced by other suitable means and being dependent on the angular position of the inductor in relation to the field, will cause an indication of the direction of the field without the use of rotating sliding contacts.

According to a further feature of the invention the short-circuited rotor winding consists of two series-connected and short-circuited coils, the planes of the coils being preferably normal to each other and the coils adapted to rotate in a plane parallel to the winding plane of one of the coils.

Further features of the invention relate to special constructions of the rotor winding.

In combination with the earth inductor as hitherto described an auxiliary alternator is used having a locally produced magnetic field. According to a feature of the invention the earth inductor can be constructed in such a manner, that the use of the auxiliary alternator is not necessary, the earth inductor being then provided with a fixed multi-phase winding.

Still further important features of the invention will appear from the following description of an embodiment of the device.

In order to describe clearly my invention I will refer to the accompanying diagrammatical drawings, wherein:—

Figures 3 and 4 show a sectional elevational view and a top plan view respectively of one embodiment of my improved earth inductor without slip rings and brushes.

Figures 5–8 are further constructions of the rotor (rotor winding) of my earth inductor.

Figure 9 shows a modification of the indicating device (earth inductor, amplifier and indicating instrument).

Figure 10 is a top plan view of the new earth inductor.

Figure 11 shows a vector diagram illustrating the radial rotor flux and its components.

Figure 1:
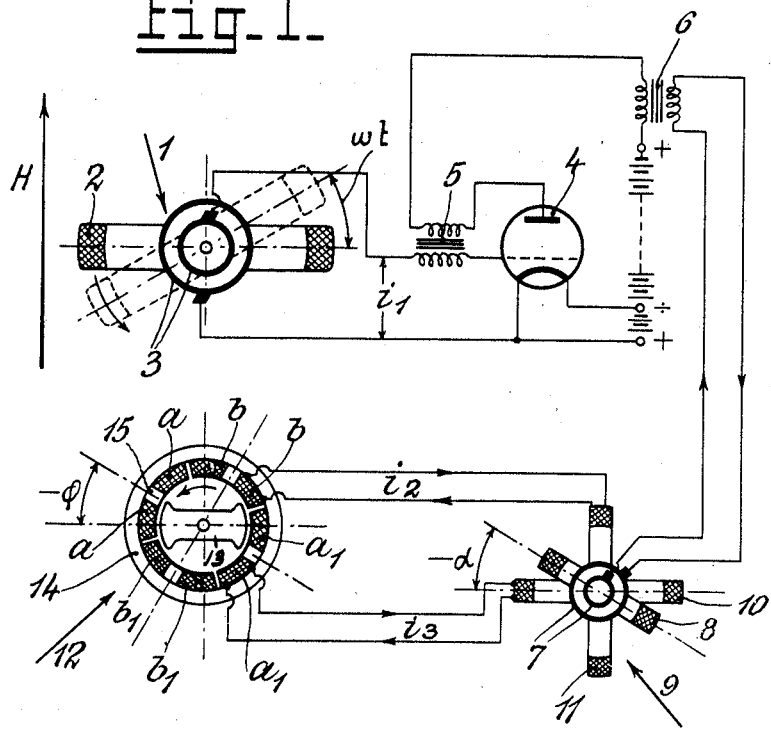
Figure 1 shows an orthodox earth inductor and auxiliary alternator with amplifier and indicating instrument.

According to Figure 1 the orthodox inductor has a rotor coil 2, rotating in a constant, preferable homogeneous magnetic field H in the direction of the arrow. When the device is to be used as a compass, H is the horizontal component of the earth magnetic field, and the axis of rotation of the inductor, in this case the earth inductor, then always must be vertical for the purpose of eliminating the influence of the vertical component of said field. In order to obtain this the earth inductor as usual is provided with gimbal suspensions.

The terminals of the rotor coil 2 are connected with two slip rings 3 provided with brushes, between which during the rotation of the coil is generated an electromotive force $e_1$ varying according to a sine law. The equation of this electromotive force is:

$$e_1 = k_1.H.\sin \omega t,$$

being $\omega$ the angular velocity and $k_1$ a constant. The axis corresponding to $t=0$ here is the X-axis, and the co-ordinate system X—Y is fixed in space or in relation to the direction of the field H.

The brushes can be directly connected with the indicating instrument described below. If, however, $e_1$ is very small, it is necessary to use amplification as shown in the figure, and the brushes then are electrically connected with each other across the grid and the cathode of the first tube of an electron tube amplifier. It is then suitable for the purpose to give the grid potential such a negative value, that the grid current and thereby the current through the coil 2 is zero. In the figure an amplifier with only one valve 4 and with a reaction transformer 5 and an output transformer 6 is shown. If a great amplification is desired more tubes are used, coupled together by means of transformers or resistances.

In the secondary winding of the output transformer an alternating current of a momentary value $i_1$ is produced, which current is proportional to $e_1$. Owing to the amplifier, however, said current is displaced a constant angle $\beta$ behind $e_1$ in phase. Consequently $i_1$ can be expressed by means of the equation:

$$i_1 = K_1.H.\sin (\omega t - \beta)$$

The current $i_1$ is conducted to the moving coil 8 in the indicating instrument 9 through two slip rings 7 or by other suitable means. The indicating instrument also is provided with two fixed cross coils 10 and 11 placed at a right angle with each other, and through which the currents $i_3$ and $i_2$ respectively are conducted. These currents have a constant mutual phase displacement of 90° and are produced as described below.

The indicating instrument operates according to the principle for phase indicators. The moving coil will be rotated into a position dependent on the phase displacement between $i_1$ and $i_2$ (and $i_3$ respectively). When consequently the currents $i_2$ and $i_3$ are produced in such a manner that their mutual phase displacement is dependent on the angular position of the earth inductor in the field H, the coil 8 as below more particularly described will be rotated into a corresponding angular position.

The currents $i_2$ and $i_3$ according to the device described in this section of the specification are produced by means of the auxiliary alternator 12 having a locally produced field. The rotor of this alternator according to the construction as shown in Fig. 1 consists of a magnet 13 rotating synchronously with the coil 2 of the earth inductor, the two being mounted on a common shaft. The magnet of course also may be formed in another shape than that shown in the figure, for instance as a horse-shoe magnet. The stator winding of the auxiliarly alternator consists of the fixed coils $a$—$a_1$ and $b$—$b_1$, these coils being wound on projections 15 on the inside of the stator ring 14. The projections are placed at a right angle in relation to each other in the same manner as the magnet poles of an ordinary generator or motor. The coils $a$—$a_1$ and $b$—$b_1$ respectively are series-connected, thereby acting in the same manner as two cross coils placed at a right angle with each other. The coils $a$—$a_1$ and $b$—$b_1$ are connected through wires with the fixed cross coils 11 and 10 respectively of the indicating instrument, so that during the rotation of the magnet 13 a rotating field will be produced in the indicating instrument.

Instead of two cross coils in the auxiliary alternator and the indicating instrument of course any suitable multi-phase winding can be used.

The co-ordinate axes $X_1$ and $Y_1$ through the centre of the coils $a$—$a_1$ and $b$—$b_1$ are fixed in relation to the stator indicating at all times the angular position of the device in relation to the direction of the field H or to the axes X—Y fixed in relation to space. Corresponding axes $X_1$—$Y_1$ also are placed through the fixed coils in the indicating instrument. In the position as shown the angle between the axis $X_1$ and the fixed axis X is $-\varphi$ (the sign here is minus, as the counter-clockwise rotation is defined as being the positive). A rotation of the stator of the inductor in relation to the field H consequently is identical with a variation of the angle $\varphi$.

When the magnet 13 is rotating electromotive forces are generated in the coils $a$—$a_1$ and $b$—$b_1$, said electromotive forces having a mutual phase displacement of 90°. The leakage flux from the magnet will not have any influence upon the coil 2 of the earth inductor, as this flux rotates with an angular velocity equal to that of the coil. In order to magnify the currents induced in the auxiliary alternator and at the same time to shield the coils, the stator ring and also the end plates of the alternator may be made of soft iron. The projections 15, however, must not consist of magnetic material, as thereby the flux during its rotation will fluctuate. If the electromotive forces induced in the auxiliary alternator at any rate are sufficiently great it is advantageous to make the stator ring 14 as well as the projections 15 of non-magnetic and insulating material, as thereby the induction of eddy currents and a distortion of the field H owing to the iron are avoided.

The shape of the magnet 13 and the shape and arrangement of the coils $a$—$a_1$ and $b$—$b_1$ preferably shall be so that the currents vary according to a sine-law. Thereby the rotating field produced in the indicating instrument will be circular.

The momentary values $e_2$ and $e_3$ of the electromotive forces induced in the coils $a$—$a_1$ and $b$—$b_1$ can be expressed by the equations:

$$e_2 = k_2.\sin (\omega t - \varphi)$$
$$e_3 = k_3.\cos (\omega t - \varphi)$$

Owing to the inductive, capacitive and ohmical resistance of the coils the corresponding currents are displaced a constant angle $\gamma$ behind in phase, and the momentary values $i_2$ and $i_3$ of the currents are:

$$i_2 = K_2.\sin (\omega t - \gamma - \varphi)$$
$$i_3 = K_3.\cos (\omega t - \gamma - \varphi)$$

The constant angle $\gamma$ of phase displacement has one and the same value for both current circuits, provided, that the shape and number of turns of the coils $a$—$a_1$, $b$—$b_1$ and 11, 10 respectively are identical. If necessary, magnification of the currents by means of electron tubes may be used.

From the above equations it will be seen, that the phase of the current $i_1$ produced by the earth inductor will not alter when the whole device and the co-ordinate axes $X_1$—$Y_1$ respectively are rotated in relation to the axes X—Y. But the phase of the currents $i_2$ and $i_3$ will alter in accordance with the angle $\varphi$ between the co-ordinate axes $X_1$ and X. The entire phase displacement angle between $i_1$ and $i_2$ for a certain angular position of the inductor consequently is:

$$\beta - \gamma - \varphi$$

where $$\beta - \gamma$$

is constant and $\varphi$ varies in accordance with the angular position of the inductor.

This variation of the phase displacement between $i_1$ and $i_2$ will cause a corresponding rotation or setting of the moving coil 8 in the indicating instrument, so that the angular position of this coil will indicate the direction of the field H. In other words, it is possible to determine the steering course of the craft, upon which the device is mounted.

The setting of the moving coil 8 of the indicating instrument can be mathematically proved as follows:

$D_2$ and $D_3$ indicate the momentums of rotation, which are exerted upon the coil 8 by the coils 11 and 10 respectively, $I_1$, $I_2$ and $I_3$ the effective values of the currents $i_1$, $i_2$ and $i_3$ and $\alpha$ the angle between the coil 8 and the $X_1$-axis. Then $D_2$ and $D_3$ can be expressed as follows:

$$D_2 = K.I_1.I_2.\sin \alpha.\cos (\beta - \gamma - \varphi)$$

$$D_3 = K.I_1.I_3.\cos \alpha.\sin (\beta - \gamma - \varphi)$$

The resulting momentum of rotation D is:

$$D = D_2 - D_3,$$

and the coil will rotate into a such position, that this momentum is zero. Then is:

$$\tan \alpha = \frac{I_3}{I_2}.\tan (\beta - \gamma - \varphi)$$

In this case is:

$$I_2 = I_3$$

and consequently:

$$\alpha = \beta - \gamma - \varphi$$

It will be seen that the angle between the coil 8 and the $X_1$-axis at all times equals the angle of phase displacement between $i_1$ and $i_2$. As, however, $$\beta - \gamma$$

is constant, $\alpha$ varies only proportional with $\varphi$. The value of $$\beta - \gamma$$

only determines the zero point on the indicating instrument. In the figure is shown $$\alpha = \varphi$$

This is correct when $$\beta - \gamma = 0$$

It must here be stated that the shape of curve of $i_1$ will have no influence on the operation of the indicating instrument, provided that the rotation field be circular. When $i_1$ does not vary according to a sine law it is only necessary to give the indicating instrument a different zero setting. The movement of the pointer as before will be quite even and proportional.

A variation of the angular velocity of the earth inductor does not affect the position of the pointer owing to the fact that the phase displacement between $i_1$ and $i_2$ is independent of said angular velocity, provided, that the electrical constants of the circuits are correctly proportioned in relation to each other.

Figure 2:
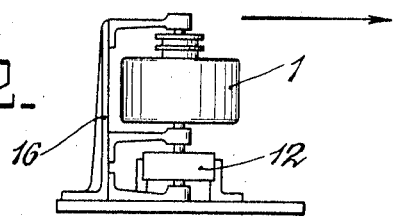
Figure 2 is a diagrammatical view of an arrangement of the earth inductor and the auxiliary alternator in relation to each other.

In Figure 2 diagrammatically is shown a manner of arrangement of the earth inductor 1 and the auxiliary alternator 12, these being mounted on a common vertical shaft. This shaft is mounted in bearings in the frame 16. The inductor and the alternator can be rotated by any suitable form of motor, for instance an electrical motor or a high-pressure air turbine. The shaft must be kept in vertical position by means of a gimbal suspension not shown in the figure. Such a gimbal suspension is necessary when the device shall be used as a compass on sea and air craft.

In Figures 3 and 4 diagrammatically is shown my improved device according to which slip rings and brushes are not used, these being replaced by electromagnetic coupling between the rotating and the fixed coils. The rotor of the earth inductor is provided with a winding consisting of two cross coils 17 and 18, which are series-connected and short-circuited. Outside the coil 18 and co-axial with the same a fixed coil 19 is placed. The rotor coil 17 is rotated about an axis parallel to the winding plane of the coil, said axis also being normal to the direction of the field H. The coil 18, the winding plane of which being normal to the winding plane of the coil 17, consequently rotates in a plane parallel to its winding plane and about an axis normal to this plane. It will be seen, that an electromotive force will be induced in the coil 17, while no electromotive force will be induced in the coil 18. The momentary value $e$ of the electromotive force induced in the coil 17 is:

$$e = k_0.H.\sin \omega t.$$

This electromotive force will produce a current $i$ going through both coils 17 and 18 and owing to the reactance etc. of the coils will be an angle $\rho$ behind $e$ in phase.

This current has the equation:

$$i = k.H.\sin (\omega t - \rho)$$

This current produces in the coil 17 a radial flux $\Phi_r$, which is a combined rotation field and a pulsating direct field. This flux by and for itself can be used in order to induce electromotive forces in fixed coils. These electromotive forces, however, would have the double frequency of rotation, and therefore said radial flux cannot be used in the device as described in the present section of the specification. The frequencies of the electromotive forces induced in the earth inductor and the auxiliary alternator must firstly be equal to each other if phase differences is to be indicated. Secondly the frequency must equal the frequency of rotation of the inductor in order to obtain a synchronous indication. The flux $\Phi_r$, however, in the device as shown in Figures 3 and 4 has no influence upon the coils 18 and 19, the mean direction of the flux being parallel to the winding plane of the coils.

In the coil 18, however, the current $i$ will produce an axial alternating flux $\Phi_a$ coupling the coils 18 and 19 magnetically together. The frequency of this flux equals the frequency of rotation of the inductor, the flux having a phase equal to that of the current $i$.

The equation of the flux is:

$$\Phi_a = k_1.H.\sin (\omega t - \rho)$$

The coils 18 and 19 form a transformer, and the flux $\Phi_a$ induces in the fixed coil 19 an electromotive force $e_1$ being 90° behind the flux in phase.

The equation of $e_1$ is:

$$e_1 = K.H. \sin(\omega t - \rho - 90°)$$

The coil 19 is connected across the grid and cathode of the first tube in an electron tube amplifier, and the coils 18 and 19 together are acting as an input transformer.

The current $i_1$ in the secondary winding of the output transformer will be an angle $\Psi$ behind $e_1$ in phase, and the equation of $i_1$ is:

$$i_1 = K_1.H. \sin(\omega t - \rho - 90° - \Psi)$$

With $$\rho - 90° - \Psi = \beta$$

as above is obtained:

$$i_1 = K_1.H. \sin(\omega t - \beta)$$

The operation of the device is the same as above described.

It will be seen, that the last described earth inductor will not be affected by the leakage flux from the auxiliary alternator owing to the position of the coil 19 in relation to the flux, nor will the fluxes of the earth inductor affect the auxiliary alternator. The flux $\Phi_a$ cannot have any influence owing to the position of the coils $a$—$a_1$ and $b$—$b_1$. Nor will the flux $\Phi_r$ have any influence when the auxiliary alternator is shielded. Also when no shielding is used the influence of $\Phi_r$ can be left out of consideration, being this flux very weak in relation to the rotation flux produced by the magnet 13.

The above described device has for its object to obtain a synchronous indication. As below described it is also possible to obtain a magnified movement of the pointer in the indicating instrument thereby, that the frequency of the currents $i_1$, $i_2$ and $i_3$ by suitable means is doubled or multiplied. Thereby in a sense an electromagnetic gearing is obtained, which profitably can be used for keeping a craft on a definite course when the indicating instrument is used as a zero instrument. The frequency of $i_2$ and $i_3$ can be doubled or multiplied by means of a corresponding construction of the auxiliary alternator. The transformation of the frequency of $i_1$, however, must be effected by means of a special device described below.

The rotor of the earth inductor as shown in the Figures 3 and 4 can be simplified as described in the following. In Figures 5 and 6 diagrammatically is shown an earth inductor together with the auxiliary alternator 12 as above described. The earth inductor as before consists of the outer fixed coil 19, inside which is rotating the rotor mounted on the shaft 20. The rotor winding consists of a single, short-circuited coil 21, the plane of which forming an angle $\alpha$ with the axis of rotation. Owing to the magnetic field H an alternating current will be induced in this coil, whereby is produced an alternating flux $\Phi$ normal to the plane of the coil. In considering the radial component $\Phi_r$ and the axial component $\Phi_a$ of this flux it will be seen, that the component $\Phi_r$ being as before a combined rotating field and a pulsating direct field, and the frequency of which equals the double rotation frequency, will have no influence upon the fixed coil 19 owing to the fact, that the mean direction of $\Phi_r$ is parallel to the winding plane of the coil. The axial component $\Phi_a$, however, will encircle the windings of the fixed coil 19, whereby as before the coils 19 and 21 are coupled together. As the frequency of the flux $\Phi_a$ equals the rotation frequency it will be seen, that by means of a single coil inclined to the axis of rotation is obtained the same result as by means of two, short-circuited cross coils.

It can be proved, that the best result is obtained when the angle $\alpha$ between the rotor coil 21 and the axis of rotation is 45° (for any given winding area), the axial component $\Phi_a$ of the flux then being maximum. Indicating as $\Phi$ and $\Phi_a$ the maximal or effective values of the fluxes, I have the following equations:

$$\Phi = k. \cos \alpha$$

$$\Phi_a = \Phi . \sin \alpha$$

$$\Phi_a = k. \sin \alpha . \cos \alpha$$

$k$ being a constant. If $\Phi_a$ is differentiated with reference to $\alpha$ and this expression made zero the condition for a maximum is obtained:

$$\frac{d\Phi_a}{d\alpha} = k. (\cos^2 \alpha - \sin^2 \alpha) = 0$$

That is:

$$\sin \alpha = \cos \alpha$$

or $$\alpha = 45°$$

Instead of a rotor multi-turn coil it is possible to use a coil with only a single, short-circuited turn without reducing the effect. Thereby the earth inductor is more simplified. The assumption then is, that the cross section of the turn is made so great, that the ohmical resistance is proportionately small. The rotor coil also may consist of a solid copper plate or the like, being mounted in an inclined position in relation to the axis.

That a rotor coil with only a single turn must have the same effect as a multi-turn coil is clear since the ampere turns of the coil and consequently also the rotor flux $\Phi$ are independent of the number of turns. The electromotive force induced certainly increases proportionally to the number of turns, but at the same time the inductive resistance of the coil increases proportionally to the square of the number of turns. Mathematically this can be shown in the following manner:

Indicating as $n$ the number of turns and $\omega$ the angular velocity, the electromotive force induced in the coil 21 is:

$$E = k.\omega.n$$

The coefficient of reactance L is:

$$L = k_1.n^2$$

Indicating by $r$ the ohmical resistance, the ampere turns of the rotor coil is:

$$I.n = \frac{E.n}{\sqrt{r^2 + \omega^2.L^2}} = \frac{k.\omega.n^2}{\sqrt{r^2 + \omega^2.k_1^2.n^4}}$$

$$I.n = \frac{k}{\sqrt{\frac{r^2}{\omega^2.n^4} + k_1^2}}$$

$k$ and $k_1$ being constants it will be seen from this equation, that the ampere turns $I.n$ and consequently also the rotor flux $\Phi$ are constant independent of the number of turns $n$, provided, that $r$ is very small so that $$\frac{r^2}{\omega^2.n^4}$$

is substantially zero. Consequently a single turn in the rotor coil is sufficient when the cross section of the turn is great.

From the last equation it also will be seen, that the rotor flux $\Phi$ increases when the angular velocity increases, provided $r$ is not a negligible quantity.

Owing to the unsymmetrical position of the rotor coil in relation to the axis of rotation the shaft will be exposed to a unilateral momentum of flexure caused by the centrifugal force. In order to avoid vibrations and breaking of the shaft caused thereby said momentum of flexure must be compensated. This may be obtained by means of counterbalance weights suitably arranged. When a coil with a single turn is used the counterbalancing can be obtained by means of a rotor coil constructed as shown in Figures 7 and 8. This coil consists of two turns 22 and 23, the planes of which are equally inclined to the shaft but in opposite directions. The turns are quite equal in shape and weight, so that the rotor is counterbalanced. Suitably they can be made of the same metal piece, for instance of a tube with an inner diameter $d$ and an outer diameter D, the tube being provided with the insections as shown. In this manner two turns inclined to each other are obtained, the turns being connected with each other at the cross points. The planes of the turns are ellipses, while the projection in axial direction is circular.

When the two turns or coils 22 and 23 are short-circuited it will be seen, that the electrical effect of the two turns will compensate each other. Therefore it is necessary to provide one of the turns, for instance 23, with one or more slits 24 in order to break the circuit of this turn. Consequently this turn only has for its object to counterbalance the other turn 22.

The turns 22 and 23 may be mounted on a cylinder 25 of insulating material (shown by dotted lines) keyed on the shaft. The turns also may consist of two crossed plates being sawed out of a solid metal piece, for instance of a cylindrical bolt. The plates then may be directly keyed on the shaft.

In the device as described above for indicating the direction for instance of the horizontal component of the earth magnetic field an auxiliary alternator, in this case a magnet inductor, is used, in which by means of a rotating magnet is produced a rotating field independent of the earth field. The indication of direction is based upon the measure of the phase difference between the currents induced in the earth inductor and the auxiliary alternator, the phase of the earth inductor current being constant, while the phase of the current induced in the auxiliary alternator is varying according to the angle position of the device in relation to the direction of the field.

In the following a species is described, whereby it is not necessary to use an auxiliary alternator, there being no other primary fields necessary than the earth magnetic field. Figure 9 shows diagrammatically the new species, and Figure 10 shows the earth inductor seen from above. Figure 11 is a vector diagram illustrating the radial rotor flux $\Phi_r$ and its components.

In the new species only an earth inductor is used. This inductor has a rotor as above described, which rotor only is affected by the earth magnetic field H. This earth inductor differs from the inductor above described only by being provided with more fixed coils.

According to Figures 9 and 10 the new earth inductor has a rotor 26 constructed in one of the manners as above described. Outside and coaxial with the rotor as before is placed the fixed coil 19. Outside (or permissibly inside) this coil a fixed two-phase winding is placed, consisting of two cross coils 27 and 28 arranged at a right angle to each other. The winding planes of these coils are parallel to the axis of rotation of the rotor. The coils must be as much as possible equal to each other. This two-phase winding also may be made in the same manner as the winding in the auxiliary alternator as above described. Also another suitable multiphase winding may be used, provided, that the winding of the indicating instrument is made in a corresponding manner.

The manner of operation of the device is based thereupon, that the radial component $\Phi_r$ as well as the axial component $\Phi_a$ of the main rotor flux $\Phi$ are used. The axial flux $\Phi_a$ has the effect as above described, this flux inducing in the fixed coil 19 an electromotive force $e_1$, the frequency of which equals the rotation frequency of the rotor and the phase of which depends on the angular position of the earth inductor in relation to the earth field. The equation of this electromotive force is:

$$e_1 = k_a . H . \sin \omega t$$

provided that the angle of phase displacement between the current and the electromotive force in the rotor winding is ignored. The axial flux has no influence upon the coils 27 and 28, the mean direction of the flux being parallel to the winding plane of these coils.

The effect of the radial flux $\Phi_r$, however, is more complicated, and will be described with reference to the diagram shown in Figure 11. In this figure the fixed cross coils 27 and 28 are shown diagrammatically, the angle between one of the coils and the fixed axis X in the position as shown being $\varphi$. This angle corresponds to the angular position of the earth inductor in relation to the earth field. The coil 29 shows diagrammatically the rotating rotor winding.

The radial rotor flux $\Phi_r$ always is normal to the plane of the rotor coil 29. When as before the angle of phase displacement between the current and the electromotive force in the rotor winding is ignored the equation of said flux is:

$$\Phi_r = k_r . \sin \omega t$$

The component $\Phi_1$ of the radial flux normal to the fixed coil 27 is:

$$\Phi_1 = \Phi_r . \cos (\omega t - \varphi) = k_r . \sin \omega t . \cos (\omega t - \varphi)$$

The electromotive force $e_2$ in the coil 27 is:

$$e_2 = -K_2 . \frac{d\Phi_1}{dt} = -K_2 . \frac{d[k_r . \sin \omega t . \cos (\omega t - \varphi)]}{dt}$$

$$e_2 = -K_2 . k_3 . \omega . \cos (2\omega t - \varphi).$$

Consequently the result is, that the electromotive force induced in the coil 27 will have the double frequency of rotation.

The component $\Phi_2$ of the radial flux normal to the other coil 28 has the equation:

$$\Phi_2 = \Phi_r \sin (\omega t - \varphi) = k_r \sin \omega t \sin (\omega t - \varphi)$$

The electromotive force $e_3$ in the coil 28 is:

$$e_3 = -K_2 . \frac{d\Phi_2}{dt} = -K_2 . \frac{d[k_r . \sin \omega t . \sin (\omega t - \varphi)]}{dt}$$

$$e_3 = -K_2 . k_r . \omega . \sin (2\omega t - \varphi).$$

This electromotive force consequently has the double frequency of rotation, being, however, displaced 90° in phase in relation to $e_2$. Accordingly, when the coils 27 and 28 either directly or indirectly are electrically connected to the corresponding coils 37 and 38 in the indicating instrument it will be seen, that a rotating field with the double rotation frequency is produced in said indicating instrument.

Owing to the fact, that the frequency of the alternating flux produced by $e_1$ in the moving coil of the indicating instrument is only the half of the rotating field frequency, no effect is obtained without special measures.

To adapt the indicating instrument for use as a zero-instrument for instance for steering of sea-craft or air-craft, which have to be kept on a definite course during navigation, it is important, that the deflection of the pointer corresponding to a small angle of yaw be as great as possible. In order to obtain this, the frequency of $e_1$ can be doubled, so that it equals the frequency of $e_2$ and $e_3$. The alternating field and the rotating field in the indicating instrument then have the same frequency, and consequently the deflection of pointer in every position is the double of the angle of rotation of the earth inductor in relation to the earth field. In other words, an electromagnetical magnification of the deflection of pointer is obtained.

The frequency of $e_2$ and $e_3$ as well as of $e_1$ also can be multiplied by suitable means, such as a thermionic rectifier or a frequency multiplying tuned transformer circuit. The multiplication, however, of the frequency of $e_1$ must be the double of the multiplication of the frequency of $e_2$ and $e_3$, in order to make all end frequencies equal to each other. Thereby the deflection of pointer corresponding to a certain angle of rotation of the earth inductor is multiplied. In other words, a great magnification is obtained.

As above described the currents produced by the electromotive forces $e_1$, $e_2$ and $e_3$ as usual must be magnified in order to obtain a sufficient intensity of the currents $i_1$, $i_2$ and $i_3$ in the coils of the indicating instrument. For this purpose as usual electron tubes are used, for instance coupled together as shown in Figure 9, the tubes 30 and 31 being placed in the circuits of the coils 27 and 28 respectively. If necessary, of course a multi-tube amplifier in each circuit can be used. The amplifier in the circuit of the coil 19 has as its first stage the tube 32 (or permissibly a multi-tube amplifier) acting only as amplifying tube. As the second stage two tubes 33 and 34 are used, these tubes have both amplifying and rectifying purposes as below described.

In order to obtain the said doubling or multiplication of the frequency for instance special transformers can be used, permissibly in combination with resonance circuits for selection of the frequency wanted. For the doubling of the frequency also a rectifier can be used, rectifying both half-cycles of the current, the rectified current going through the primary of a usual transformer. The frequency of the current induced in the secondary winding then will be the double of the frequency of the original alternating current. It will be of advantage to use an electron tube rectifier, this at the same time acting as an amplifier.

In accordance with Figure 9 the rectifier comprises the electron tubes 33 and 34 provided as usual with grids. As will be seen the tubes are coupled in such a manner that both half-cycles of the current are rectified. In the figure grid rectification is shown. However, also anode-rectification can be used. The plate current of the magnifying tube 32, having a frequency equal to the frequency of $e_1$, is led into the primary winding of a transformer 35, the secondary of which from the central point is connected to the cathodes of the tubes. The terminals of the secondary winding are connected to the grids of the tubes 33 and 34. Thereby in the primary winding of the output transformer 36 is produced a beat direct current owing to the fact, that both half cycles of the plate current of the tube 32 have been rectified. In the secondary winding of the transformer 36, being connected to the movable coil 39 in the indicating instrument, consequently an alternating current $i_1$ is produced, the frequency of which is the double of the rotation frequency thereby being equal to the frequency of the currents $i_2$ and $i_3$ in the fixed coils of the indicating instrument. If necessary, an additional magnifier can be series-connected with the frequency-doubling device.

When a multiplication of the frequency is wanted more frequency doubling devices can be connected in series. As above described also special transformers can be used, eventually in connection with resonance circuits for selecting the frequency wanted.

According to the arrangements just described a very simple and compact construction of the earth inductor is obtained, making at the same time the use of a special shaped and rotating magnet for producing a circular rotating field in the indicating instrument unnecessary. By the present device the rotating field in the indicating instrument is always circular, provided, that the multi-phase winding is a symmetrical one. Also it is of importance, that the three coils of the earth inductor have no influence on each other, all coils being normal to each other and being influenced only by the rotor field.

I wish it to be clearly understood, that many and apparently wildly different embodiments of my above described device are possible without departing from the scope of my invention as defined by the subjoined claims.

I claim:

1. A device for indicating magnetic field directions of the type employing the electromotive force induced in an inductor rotating in the magnetic field to indicate the direction of the field, comprising an inductor including a short-circuited rotor winding so formed as to produce an axial and a radial rotor flux, rotating means for said rotor, and a fixed coil in which the flux induced by rotation of said rotor generates an alternating electromotive force the phase of which is independent of the angular position of the device in relation to the magnetic field, a field direction indicator element, an auxiliary alternator for producing an alternating electromotive force, the phase of which is dependent on the angular position of the device in relation to the magnetic field and means connecting the inductor and alternator to respective circuits of said indicator element, the displacement of such indicator element being proportional to the phase difference of the two alternating electromotive forces.

2. A device for indicating magnetic field directions as claimed in claim 1 in which the short-circuited rotor winding comprises two series-connected and short-circuited coils, the planes of said coils being normal to each other, and the axis of rotation of the winding being parallel to the plane of one of the coils and perpendicular to the plane of the other.

3. A device for indicating magnetic field directions as claimed in claim 1 in which the short-circuited rotor winding comprises a single short-circuited coil having its winding plane disposed at an angle to the axis of rotation of said winding.

4. A device for indicating magnetic field directions as claimed in claim 1 in which the short-circuited rotor winding comrises a single short-circuited coil having its winding plane disposed at an angle of 45 degrees to the axis of rotation of said winding.

5. A device for indicating magnetic field directions as claimed in claim 1, in which the short-circuited rotor is constituted by a solid metal ring acting as a single turn short-circuited coil with its plane at an angle substantially less than 90° to the rotor axis.

6. A device for indicating magnetic field directions as claimed in claim 1 in which the short-circuited rotor comprises two metal rings disposed at equal angles with, but in opposite directions to, the axis of rotation of the rotor winding to constitute a pair of single-turn coils, one of said rings having a radial slit to open circuit the turn and being adapted to act as a mechanical counterbalance for the other ring.

7. A device for indicating magnetic field directions as claimed in claim 1 in which the short-circuited rotor winding comprises a cylinder V-notched at opposite sides and at each end to form two conductor rings disposed at equal angles with, but in opposite directions to, the axis of the cylinder and constituting a pair of single-turn coils, one of said rings having a longitudinal slit to open-circuit the turn and being adapted to act as a mechanical counterbalance for the other ring.

8. A device for indicating magnetic field directions as claimed in claim 1 in which the short-circuited rotor winding comprises a hollow cylinder V-notched at opposite sides and at each end to form two single turn coils disposed at equal angles with, but in opposite directions to, the axis of the cylinder, one of said coils having a gap therein to open-circuit the turn and adapted to act as a mechanical counterbalance for the other plate.

9. In a device for indicating magnetic field directions including an inductor producing an alternating electromotive force, the phase of which is independent of the angular position of the device with respect to the field and an auxiliary alternator producing an electromotive force, the phase of which is dependent on the angular position of the device with respect to the field, and a field direction indicator element, the displacement of which is a measure of the phase displacement of said two electromotive forces, said auxiliary alternator comprising an inductor rotor having a short-circuited rotor coil, means for rotating the rotor, a fixed coil coaxial with the rotor and acting as the secondary winding of a transformer of which the primary winding is the said rotor coil so that the alternating electromotive force induced in the rotor coil is transmitted to the fixed coil without change in its frequency.

10. In a device for indicating magnetic field directions as claimed in claim 9, said auxiliary alternator having multi-phase stator windings and a rotor therein adapted to rotate in synchronism with the inductor rotor.

11. In a device for indicating magnetic field directions as claimed in claim 9, said auxiliary alternator having a permanent magnet rotor and pairs of crossed stator coils to produce a multi-phase electromotive force of a phase number corresponding to the number of pairs of coils, the coils of each pair being disposed to each other at equal angles.

12. In a device for indicating magnetic field directions as claimed in claim 9, said auxiliary alternator having a permanent magnet rotor and pairs of crossed stator coils to produce a multi-phase electromotive force of a phase number corresponding to the number of pairs of coils, the coils of each pair being disposed to each other at equal angles, and the rotor and fixed coils being of such form as to produce an alternating electromotive force of sine wave form.

13. In a device for indicating magnetic field directions of the type employing an inductor rotating in the magnetic field generating an alternating electromotive force, the phase of which is independent of the angular position of the device with respect to the field and a source of alternating electromotive force, the phase of which is dependent on the angular position of the device with respect to the field and a field direction indicator element responsive to the phase difference of the two electromotive forces, an inductor rotor comprising a short-circuited rotor winding so shaped as to produce an axial and a radial flux component when the rotor is rotated, means for rotating the rotor, a fixed coil coaxial with the rotor and acting as the secondary of a transformer of which the primary is the rotor coil, the electromotive force induced therein being due to the axial flux component of the rotor, and an auxiliary alternating electromotive force source comprising fixed coils disposed at an angle to one another and with their winding planes parallel to the axis of rotation of the rotor and in which said auxiliary electromotive force is induced by the radial component of the rotor flux.

14. In a device for indicating magnetic field directions as claimed in claim 13, means for converting the frequency of the electromotive force generated in the fixed coil coaxial with the rotor by the rotation of the rotor to that of the auxiliary electromotive force, whereby the displacement of the field direction indicator element is multiplied by the phase number of the auxiliary electromotive force.

15. In a device for indicating magnetic field directions as claimed in claim 13, means constituted by a thermionic valve rectifier for converting the frequency of the electromotive force generated in the fixed coil coaxial with the rotor by the rotation of the rotor to that of the auxiliary electromotive force, whereby the displacement of the field direction indicator element is multiplied by the phase number of the auxiliary electromotive force.

KOLBEIN SYDNES.